Oct. 31, 1950     C. C. GROVES     2,527,634
BARBED WIRE REEL FOR TRACTORS
Filed Aug. 15, 1946
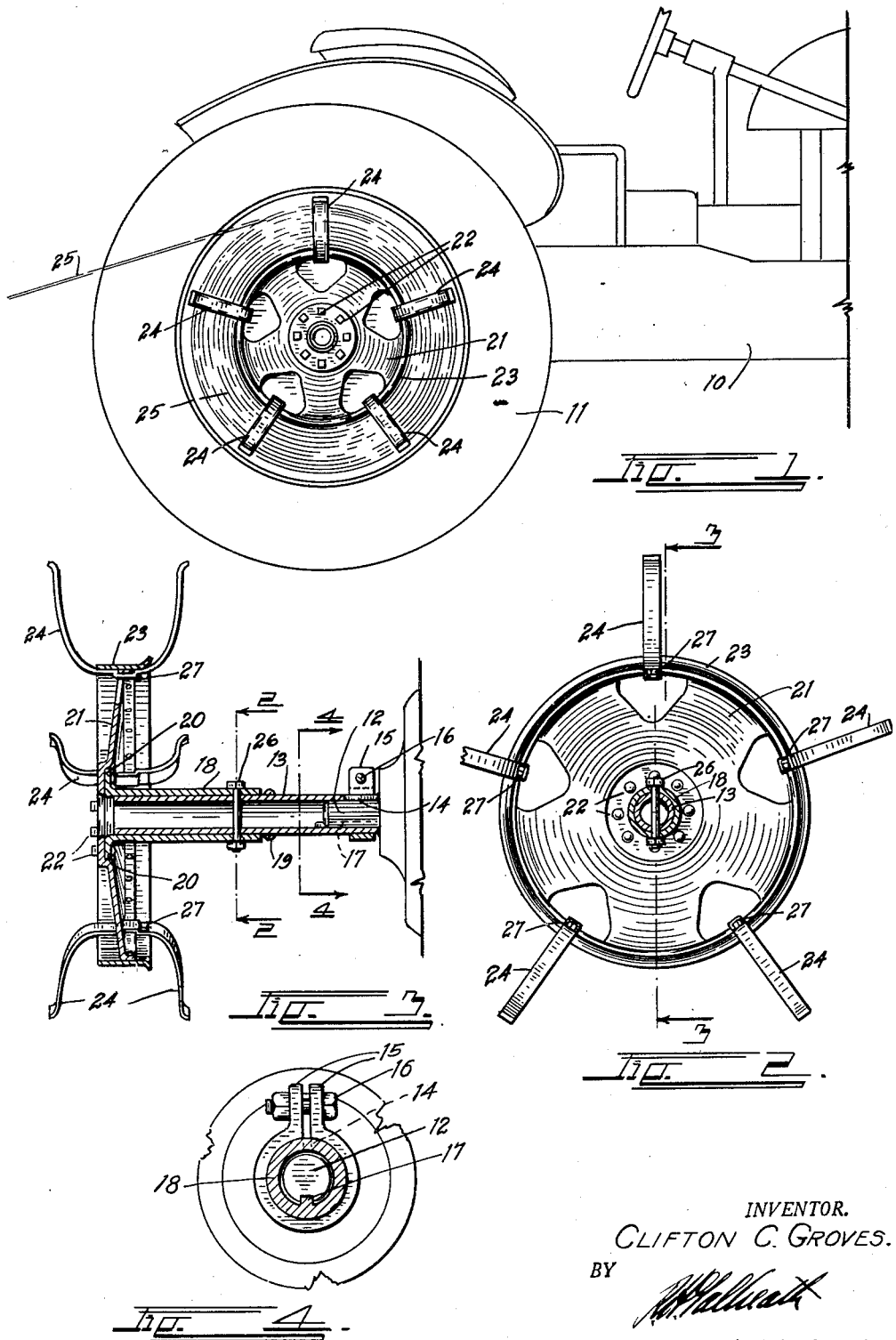
INVENTOR.
CLIFTON C. GROVES.
BY
ATTORNEY.

UNITED STATES PATENT OFFICE 2,527,634

BARBED-WIRE REEL FOR TRACTORS

Clifton C. Groves, Mexico, Mo.

Application August 15, 1946, Serial No. 690,735

1 Claim. (Cl. 242—95)

This invention relates to a barbed wire reel attachment for tractors, and has for its principal object the provision of a highly efficient barbed wire reel which can be quickly and easily attached to a conventional farm tractor, and which can be used for playing out the barbed wire for fence-building, or for reeling in the wire when fences are being torn down or moved.

Another object of the invention is to so construct the reel that it can be easily and cheaply manufactured and so that it can be installed for use by means of a simple wrench and instantly removed and replaced by manipulation of a single pin.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of a typical farm tractor, illustrating the improved barbed wire reel in place thereon;

Fig. 2 is an inside face view of the improved reel, taken on the line 2—2, Fig. 3;

Fig. 3 is a longitudinal section through the improved reel, taken on the line 3—3, Fig. 2; and Fig. 4 is an enlarged detail section, taken on the line 4—4, Fig. 3.

In Fig. 1 typical parts of a conventional farm tractor are designated by numeral as follows: chassis 10, rear wheel 11, and projecting rear axle 12.

The improved reel is designed to be mounted on the extremity of the projecting axle 12. Most farm tractors are constructed with a projecting axle so that the position of the wheel may be changed, and this invention makes use of this conventional feature.

The improved reel consists of a tubular shaft 13 of a size to fit snugly over the extremity of the axle 12. The extremity of the tubular shaft 13, which receives the axle 12, is split, as shown at 14, and this split may be drawn together by means of a clamp 15 actuated by a clamp bolt 16. The latter extremity of the tubular shaft is also provided with a feather key 17 which is welded or otherwise secured within the tubular shaft and engages the standard keyway of the axle 12.

A tubular hub member 18 is rotatably mounted on the tubular shaft 13 and extends therealong for the larger portion of its length to provide a steady bearing. A set collar 19 is welded or otherwise secured about the tubular shaft to stop the hub member's inward movement at a predetermined point. The hub member 18 may be fixed to the shaft 13 so as to rotate therewith by passing a locking bolt or pin 26 through aligned receiving openings in the hub member 18 and the shaft 13.

The outer extremity of the hub member 18 is flanged outwardly, as shown at 20, and a wheel, which may be a conventional automotive wheel 21, is secured to the flange 20 by means of wheel bolts 22. The wheel 21 carries the conventional channeled tire rim 23.

A plurality of U-shaped, reel-forming strips 24 are removably secured to the inner face of the rim 23 by means of bolts and nuts 27, and extend radially outward from both sides thereof. The U-shaped strips 24 form the reel for receiving a coil of barbed wire, such as indicated at 25.

For unreeling wire along a fence line, the wire is coiled about the rim 23 within the confines of the strips 24 so that it will extend rearwardly from the upper portion of the rim, as indicated in Fig. 1. The locking bolt 26 is removed and the tractor is driven forwardly along the fence line.

It will be noted that the wheel 11 and the axle 12 are moving forwardly, whereas the wire 25 is rotating the reel rearwardly. The friction between the hub member 18 and tubular member 13 maintains the wire taut as it unreels.

For reeling the wire on the reel, the bolt 26 is inserted and the tractor wheel is driven forwardly, causing the latter to reel onto the reel from the bottom.

The reel can be instantly removed from the shaft 13 by simply removing the locking bolt 26 and pulling it from the extremity of the shaft 13. Should it be desired to leave the latter in place, the complete device can be quickly removed from the tractor by loosening the clamp bolt 16 and pulling the shaft 13 from the axle 12. The coil of wire 25 may be removed and replaced by removing the nuts 27 from three of the strips 24 and slipping the strips from place.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A winding reel for tractors of the type having a protruding wheel axle, comprising: a tubular shaft having a split extremity adapted to fit snugly over the extremity of the wheel axle; means for drawing said split together to secure said shaft to said axle; a key in said extremity engaging a keyway in said axle; a tubular hub member rotatably mounted on said tubular shaft and extending therealong for the major portion of the length of the latter; a set collar secured to said shaft to limit the inward movement of said hub member, said shaft and said hub being provided with registering, diametrically-extending openings; a locking pin extending through said registering openings to cause said hub member to rotate with said shaft; a wheel fixedly mounted on said hub member; a channeled rim on said wheel; and a plurality of U-shaped, reel-forming strips removably secured to said rim and extending diametrically therefrom.

CLIFTON C. GROVES.

REFERENCES CITED

The following references are of record in the file of this patent:

UNITED STATES PATENTS

| Number | Name | Date |
|---|---|---|
| 265,197 | Waterman | Sept. 26, 1882 |
| 298,678 | Dupee et al. | May 13, 1884 |
| 1,892,785 | Keiser | Jan. 3, 1933 |
| 1,976,314 | White | Oct. 9, 1934 |